(12) United States Patent
Kajitani et al.

(10) Patent No.: US 9,713,907 B2
(45) Date of Patent: Jul. 25, 2017

(54) TIRE VULCANIZING APPARATUS

(71) Applicant: MITSUBISHI HEAVY INDUSTRIES MACHINERY TECHNOLOGY CORPORATION, Hiroshima-shi, Hiroshima (JP)

(72) Inventors: Fumito Kajitani, Tokyo (JP); Kazutoshi Yokoo, Tokyo (JP); Koji Shintani, Hiroshima (JP)

(73) Assignee: MITSUBISHI HEAVY INDUSTRIES MACHINERY TECHNOLOGY CORPORATION, Hiroshima-shi, Hiroshima (JP)

( * ) Notice: Subject to any disclaimer, the term of this patent is extended or adjusted under 35 U.S.C. 154(b) by 0 days.

(21) Appl. No.: 15/108,469

(22) PCT Filed: Jan. 26, 2015

(86) PCT No.: PCT/JP2015/051979
§ 371 (c)(1),
(2) Date: Jun. 27, 2016

(87) PCT Pub. No.: WO2016/120960
PCT Pub. Date: Aug. 4, 2016

(65) Prior Publication Data
US 2016/0361882 A1 Dec. 15, 2016

(51) Int. Cl.
*B29D 30/06* (2006.01)
*B29C 33/02* (2006.01)
*B29C 35/02* (2006.01)
*B29C 35/08* (2006.01)
*B29K 105/24* (2006.01)

(52) U.S. Cl.
CPC .......... *B29D 30/0662* (2013.01); *B29C 33/02* (2013.01); *B29C 35/02* (2013.01);
(Continued)

(58) Field of Classification Search
CPC ............ B29D 30/0654; B29D 30/0662; B29D 2030/0674; B29C 35/0805; B29C 2035/0822
See application file for complete search history.

(56) References Cited

U.S. PATENT DOCUMENTS 2,094,511 A  9/1937 Welch
3,770,858 A  11/1973 Ireland et al.
(Continued)

FOREIGN PATENT DOCUMENTS

EP  1053861 A2  11/2000
EP  1177872 A2  2/2002
(Continued)

OTHER PUBLICATIONS

PCT/ISA/210, "International Search Report for International Application No. PCT/JP2015/051979," Mar. 10, 2015.
(Continued)

*Primary Examiner* — James Mackey
(74) *Attorney, Agent, or Firm* — Manabu Kanesaka; Benjamin Hauptman; Kenneth Berner (57) ABSTRACT

A tire vulcanizing apparatus of the present invention includes a liftable center post which supports a green tire, and a heating portion which is fixed to the center post, is disposed inside the green tire, and transmits heat from the inside of the green tire to the green tire by radiation heat.

6 Claims, 4 Drawing Sheets

(52) U.S. Cl.
CPC ...... *B29C 35/0805* (2013.01); *B29D 30/0654* (2013.01); *B29C 2035/0822* (2013.01); *B29D 2030/0674* (2013.01); *B29K 2105/246* (2013.01)

(56) References Cited

U.S. PATENT DOCUMENTS

| | | | |
|---|---|---|---|
| 4,310,374 A | 1/1982 | MacMillan | |
| 6,655,940 B2 * | 12/2003 | Mitamura | B29D 30/0645 425/40 |
| 2009/0308861 A1 | 12/2009 | Okada et al. | |

FOREIGN PATENT DOCUMENTS

| | | |
|---|---|---|
| JP | H05-104541 A | 4/1993 |
| JP | H09-123172 A | 5/1997 |
| JP | 2001-322128 A | 11/2001 |
| JP | 2002-018857 A | 1/2002 |
| JP | 2006-062213 A | 3/2006 |
| JP | 2006-231931 A | 9/2006 |
| JP | 4387047 B2 | 12/2009 |
| JP | 2011-116062 A | 6/2011 |
| JP | 2012-218299 A | 11/2012 |

OTHER PUBLICATIONS

PCT/ISA/237, "Written Opinion of the International Searching Authority for International Application No. PCT/JP2015/051979," Mar. 10, 2015.
Taiwan Patent Office, "Office Action for Taiwanese Patent Application No. 104102690," Nov. 9, 2016.
Europe Patent Office, "Search Report for European Patent Application No. 15871301.6," Mar. 7, 2017.

* cited by examiner

TIRE VULCANIZING APPARATUS

RELATED APPLICATIONS

The present application is National Phase of International Application No. PCT/JP2015/051979 filed Jan. 26, 2015, the disclosure of which is hereby incorporated by reference herein in its entirety.

TECHNICAL FIELD

The present invention relates to a tire vulcanizing apparatus.

BACKGROUND ART

In the related art, a green tire which is molded by a molding machine is vulcanized and molded by a vulcanizing apparatus. For example, PTL 1 discloses a center mechanism having heat generation means which is disposed at an outer circumferential position of a center post on a tire inner circumferential side of a green tire and applies an amount of heat to the green tire, and moving means which can move the heat generation means at an arbitrary position independently from lifting and lowering of the center post.

CITATION LIST

Patent Literature

[PTL 1] Japanese Patent No. 4387047

SUMMARY OF INVENTION

Technical Problem

However, in the technology disclosed in PTL 1, since the heat generation means is movable with respect to the center post of the center mechanism, the configuration of the center mechanism is complicated.

The present invention is made in consideration of the above-described circumstances, and an object thereof is to provide a tire vulcanizing apparatus capable of heating a green tire using radiation heat from the inside of the green tire by a simple configuration.

Solution to Problem

According to an aspect of the present invention, there is provided a tire vulcanizing apparatus, including: a liftable center post in which a portion thereof is inserted into a green tire; and a heating portion which is fixed to the center post, is disposed inside the green tire, and transmits heat from the inside of the green tire to the green tire by radiation heat.

Since the tire vulcanizing apparatus of the aspect has the configuration in which the heating portion is fixed to the center post, it is possible to heat the green tire from the inside of the green tire by using the radiation heat by a simple configuration.

The heating portion may include: a heater which emits the radiation heat; and an openable and closable shield portion which is interposed between the heater and an inner surface of the green tire and blocks the radiation heat from the heater.

In this case, according to the open state and the closed state in the shield portion, a state where the heat from the heater is transmitted to the inner surface of the green tire and a state where the heat from the heater is not transmitted to the inner surface of the green tire are switchable with each other.

The shield portion may include: a shield member which is formed in a tubular shape to surround the heater; and a movement mechanism which moves the shield member between a shield position at which the shield member surrounds the heater and an unshielded position at which the heater is positioned outside of the shield member.

In this case, when the shield member is positioned at the shield position at which the shield member surrounds the heater, the heat of the heater is shielded by the shield member and does not reach the green tire. In addition, since the shield member is moved by the movement mechanism, the open state and the closed state in the shield portion are changed.

The heater may include a plurality of heater members which are movable relative to each other, and the plurality of heater members may be disposed to be movable to any one of a storage state in which the plurality of heater members overlap each other to have outer diameters capable of being accommodated in the shield member, and a heat generation state in which the plurality of heater members have outer diameters exceeding an inner diameter of the shield member and overlap each other less relative to the storage state.

In this case, the size of the heater is small in the storage state, and in the heat generation state, when the heater is positioned outside of the shield member, the heater members overlap each other less, and it is possible to secure a wide area capable of emitting the radiation heat.

The tire vulcanizing apparatus of the aspect may further include a bladder for pressing the inner surface of green tire, and at this time, the center post may hold the heating portion inside the bladder.

In this case, the heating portion heats the green tire via the bladder.

The tire vulcanizing apparatus of the aspect may further include a gas supply portion which supplies dry gas into the bladder.

In this case, since the dry gas is in a gaseous state without being liquefied in the bladder, the temperature inside the bladder easily becomes uniform.

The tire vulcanizing apparatus of the aspect may further include a steam supply portion which supplies steam into the bladder.

In this case, since steam is not easily liquefied due to the heating of the bladder by the heating portion, the temperature inside the bladder easily becomes uniform.

Advantageous Effects of Invention

According to the present invention, it is possible to provide the tire vulcanizing apparatus capable of heating the green tire using radiation heat from the inside of the green tire by a simple configuration.

DESCRIPTION OF EMBODIMENTS

First Embodiment

Figure 1:
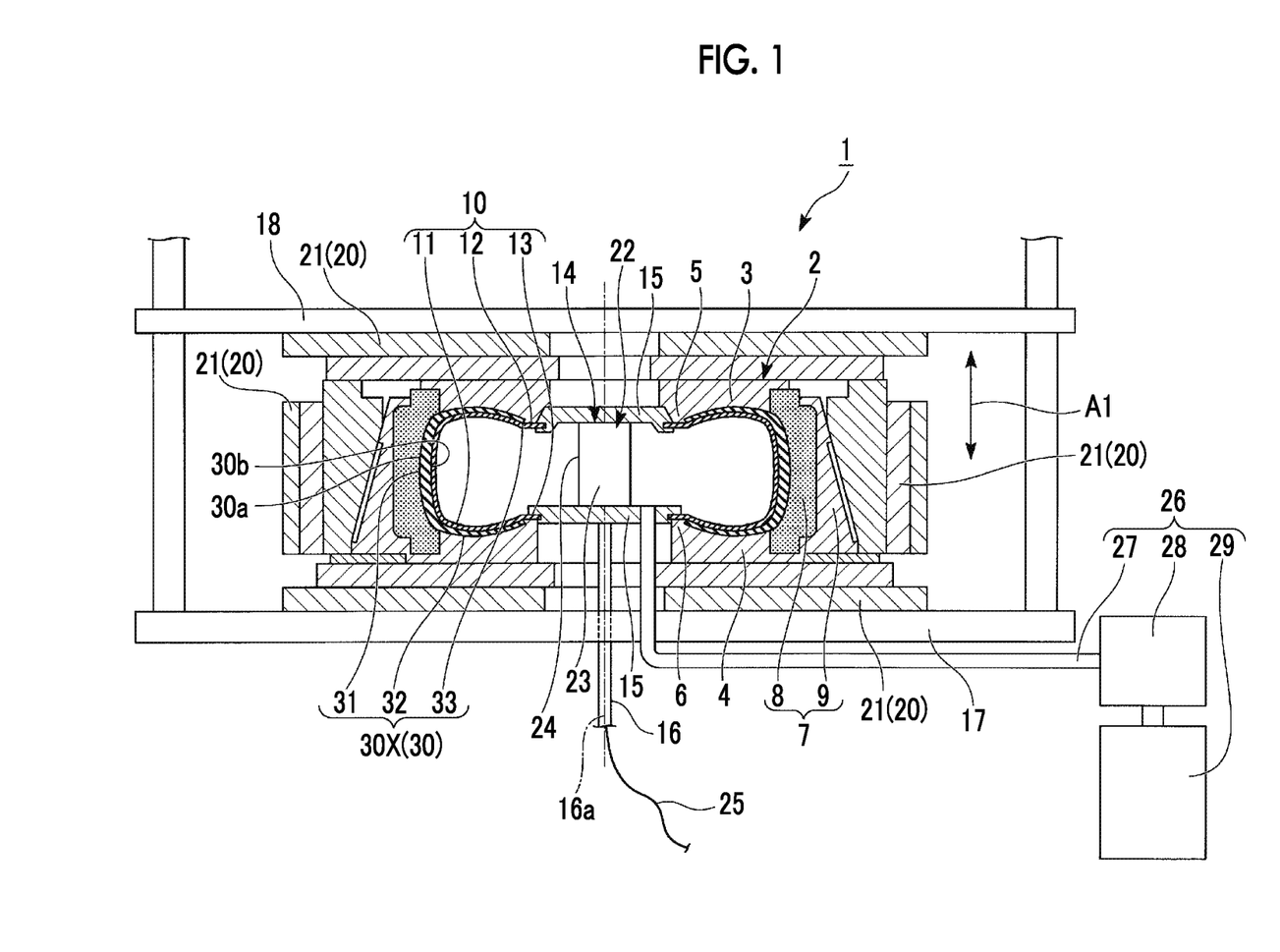
FIG. 1 is a partial sectional view showing a tire vulcanizing apparatus according to a first embodiment of the present invention.

A first embodiment of the present invention is described. FIG. 1 is a partially sectional view showing a tire vulcanizing apparatus according to the present embodiment.

A tire vulcanizing apparatus 1 of the present embodiment shown in FIG. 1 includes a tire mold 2, a bladder 10, a center mechanism 14, a mold fixing mechanism 17, a mold lifting and lowering mechanism 18, a tire heating mechanism 20, and a gas supply portion 26.

The tire mold 2 includes an upper side mold 3, a lower side mold 4, an upper bead ring 5, a lower bead ring 6, and a tread mold 7.

The upper side mold 3 and the lower side mold 4 are metal molds for molding both side walls 32 of the tire 30. The upper side mold 3 is attached to the mold lifting and lowering mechanism 18. The lower side mold 4 is attached to the mold fixing mechanism 17.

The upper bead ring 5 and the lower bead ring 6 are metal molds for forming both beads 33 of the tire 30.

The tread mold 7 includes a tread segment 8 and a slide segment 9.

The tread segment 8 is a metal mold which transfers a tread pattern to the tread portion 31 of the green tire 30X.

The slide segment 9 holds the tread segment 8 such that the tread segment 8 is movable in a radial direction of the tire 30. The slide segment 9 is connected to the mold lifting and lowering mechanism 18.

In addition, the configuration of the tire mold 2 is not limited to the above-described configuration. For example, the configuration of the tire mold 2 may be appropriately selected according to a shape of a produced tire or the like.

A bladder 10 is a hollow member for pressing the green tire 30X disposed inside the tire mold 2 to the tire mold 2 from the inside when the tire vulcanizing apparatus 1 is used. The bladder 10 includes a main body portion 11 which has a shape corresponding to the inner surface shape of the tire 30 vulcanized and molded by the tire vulcanizing apparatus 1 of the present embodiment, and an upper clamp portion 12 and a lower clamp portion 13 which are connected to the center mechanism 14. Since the inner portion of the bladder 10 is filled with gas, the bladder 10 presses an inner surface 30b of the green tire 30X. Moreover, the bladder 10 is heated by a heater 23 described below, and the green tire 30X can be heated from the inner surface 30b side via the bladder 10.

In addition, the configuration of the bladder 10 is not limited to the above-described configuration.

The center mechanism 14 includes a pair of bladder clamp rings 15 which is connected the upper clamp portion 12 and the lower clamp portion 13 of the bladder 10, and a center post 16 which is connected to the pair of bladder clamp rings 15. The center mechanism 14 moves the pair bladder clamp rings 15 relative to each other in a center line 16a direction of the center post 16, and displaces the bladder 10 such that the bladder 10 is inserted into and detached from the green tire 30X.

The center post 16 supports a green tire 30X which is attached to the tire mold 2. The center post 16 of the present embodiment supports the green tire 30X via the bladder clamp ring 15 and the bladder 10.

Moreover, the configuration of the center mechanism 14 is not limited to the above-described configuration.

The mold fixing mechanism 17 may appropriately select a known configuration capable of supporting the center mechanism 14 and the lower side mold 4.

The mold lifting and lowering mechanism 18 causes the upper side mold 3 and the tread mold 7 to move forward and backward with respect to the lower side mold 4 in the center direction of the center post 16. Moreover, in the present embodiment, the slide segment 9 of the tread mold 7 moves toward the center post 16 side as the mold lifting and lowering mechanism 18 causes the tread mold 7 to approach the mold fixing mechanism 17.

In addition, the configuration of the mold lifting and lowering mechanism 18 is not limited to the above-described configuration.

The tire heating mechanism 20 includes an outer heating mechanism 21 which heats the green tire 30X from the outer surface 30a side of the green tire 30X via the upper side mold 3, the lower side mold 4, and the tread mold 7, and an inner heating mechanism 22 (heating portion) which is attached to the center post 16 and heats the green tire 30X from the inner surface 30b side of the green tire 30X.

For example, the outer heating mechanism 21 has a high-temperature steam channel, and heats the green tire 30X from the outside by the heat of the high-temperature steam. In addition, the configuration of the outer heating mechanism 21 is not limited to the above-described configuration.

The inner heating mechanism 22 includes a heater 23 which is attached to the center post 16, and a wire 25 which supplies power to the heater 23.

The heater 23 heats the tire 30 supported by the upper and lower bead rings from the inside of the tire 30 by radiation heat. In the present embodiment, the heater 23 heats the tire 30 via the bladder 10. In addition, in a case where the tire vulcanizing apparatus 1 does not include the bladder 10, the heater 23 may directly heat the tire 30 from the inside of the tire 30.

The shape of the heater 23 is formed in a tubular shape which surrounds the center post 16 and is coaxial with the center line 16a of the center post 16. An radiation surface 24 which emits radiation heat toward the inner surface 30b of the green tire 30X is formed on the outer circumferential surface of the heater 23. In addition, the shape of the heater 23 is not limited to the tubular shape. For example, the heater 23 may be formed in a rectangular cylindrical shape. Moreover, the entire outer circumferential surface of the heater 23 may be the radiation surface 24, and a portion of the outer circumferential surface of the heater 23 may be the radiation surface 24.

In the heater 23, the known heat generation method which receives supply of power to generate heat may be appropriately selected so as to be applied. That is, as the heater 23 of the present embodiment, an infrared heater, a ceramic heater, a carbon heater, or the like may be adopted. For example, preferably, the wavelength of the radiation heat from the heater 23 is a wavelength capable of effectively heating the bladder 10 according to absorption wavelength characteristics of the bladder 10. As a heater which can suitably heat the bladder 10 according to the absorption wavelength characteristics of a resin such as rubber configuring the bladder 10, there is an infrared heater which has a wavelength of approximately 3.5 μm as a peak. For example, since a ceramic heater has a peak of a wavelength of radiation heat within a range from 3 μm to 6 μm, the ceramic heater is particularly suitable for the heater 23 of the present embodiment. In addition, in a carbon heater, a peak of a wavelength of radiation heater may be shorter than that of the ceramic heater. However, since time which is required to increase to an optimal temperature for vulcanization so as to be stabilized is short and the carbon heater can be heated at a higher temperature relative to the ceramic heater, the carbon heater is effective.

The wire 25 is disposed inside the center post 16 and is connected to the heater 23 and a power supply (not shown).

The gas supply portion 26 supplies dry gas into the bladder 10 when vulcanization-molding with respect to the green tire 30X is performed, and recovers the dry gas from the inside of the bladder 10 after the vulcanization-molding. In the present embodiment, the gas supply portion 26 includes a gas pipeline 27 which is provided in one or both of the pair of bladder clamp rings 15 and communicates with the inner portion of the bladder 10, a compressor 28 which supplies and extracts the dry gas through the gas pipeline 27, and a dry gas tank 29.

Composition of the dry gas is not particularly limited. For example, nitrogen gas may be adopted as the dry gas.

An operation of the tire vulcanizing apparatus 1 of the present embodiment is described.

When the tire vulcanizing apparatus 1 of the present embodiment is used, as shown in FIG. 1, the green tire 30X is placed on the lower side mold 4 in a state where the bladder 10 and the heater 23 are disposed inside the green tire 30X. In addition, the tread mold 7 and the upper side mold 3 are attached so as to cover the outer surface 30a of the green tire 30X.

After the tire mold 2 is completely closed, the outer heating mechanism 21 heats the green tire 30X from the outer surface 30a of the green tire 30X via the upper side mold 3, the lower side mold 4, and the tread mold 7. In addition, the dry gas is supplied into the bladder 10 by the gas supply portion 26 so as to advance the bladder 10, and the outer surface 30a of the green tire 30X is pressed to the inner surface of the tire mold 2 by the bladder 10. The dry gas supplied into the bladder 10 is heated by the heater 23. The bladder 10 is heated by the dry gas which is heated by the heater 23. In addition, the radiation heat from the heater 23 directly reaches the inner surface of the bladder 10 to heat the bladder 10.

If the bladder 10 is heated, heat is transmitted from the bladder 10 to the inner surface of the green tire 30X, and the green tire 30X is heated from the inner surface 30b of the green tire 30X.

The dry gas which fills the inner portion of the bladder 10 flows in the bladder 10 so as to approximately uniformly heat the inner surface of the bladder 10. Since the dry gas is in a gaseous state without being liquefied under an operation circumstance of the tire vulcanizing apparatus 1, the gas state dry gas flows in the bladder 10. In addition, since the heated dry gas circulates between the bladder 10 and the gas supply portion 26, a gas flow may be generated in the bladder 10. In this case, it is possible to further uniformize the temperature inside the bladder 10.

In the present embodiment, the green tire 30X is vulcanized and molded in the tire mold 2 by the heater 23 and the outer heating mechanism 21.

As described above, according to the tire vulcanizing apparatus 1 of the present embodiment, since the heater 23 fixed to the center post 16 heats the inner surface 30b of the green tire 30X, it is possible to heat the green tire from the inside of the green tire 30X using radiation heat by a simple configuration.

Modification Example

Figure 2:
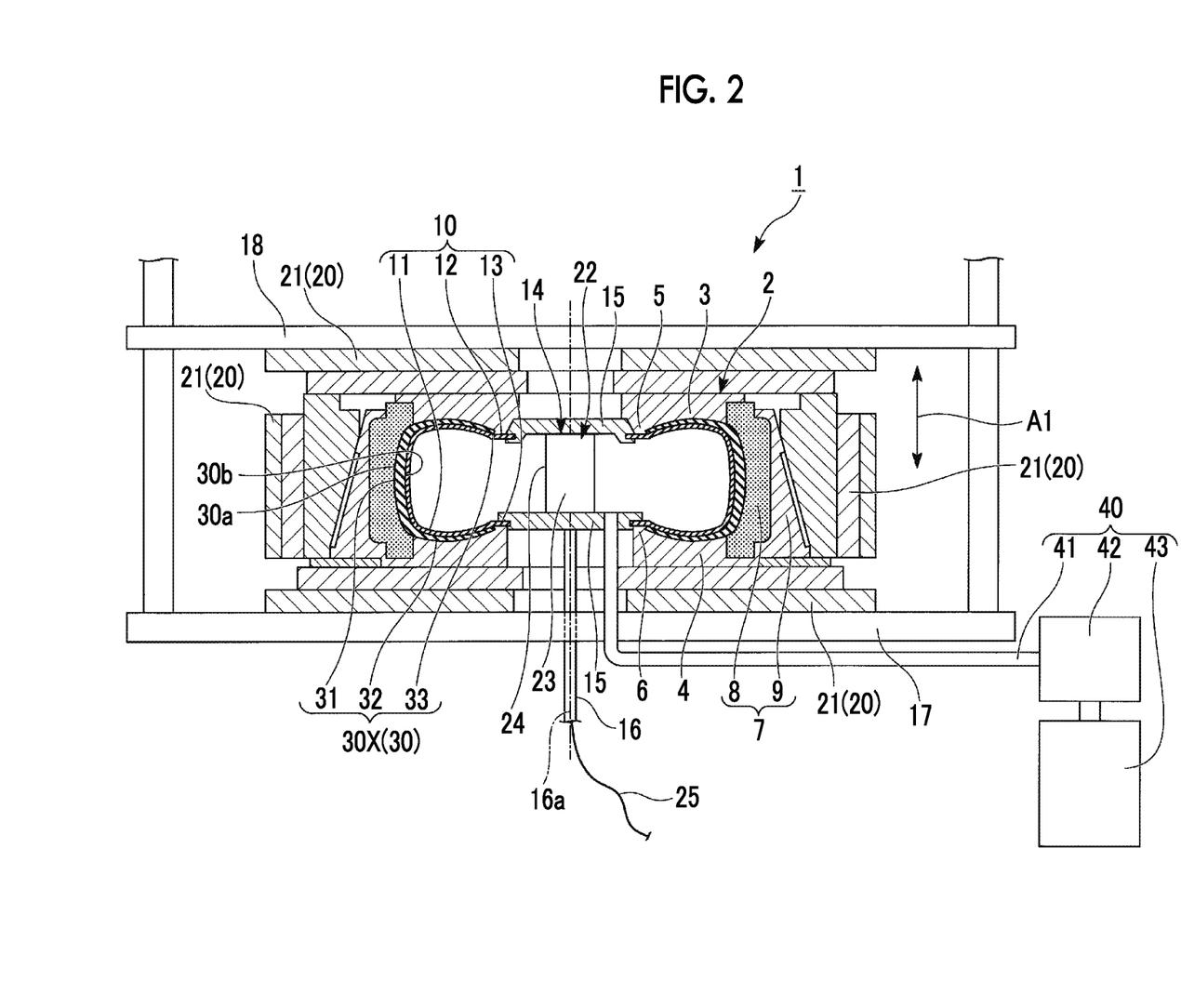
FIG. 2 is a partial sectional view showing a tire vulcanizing apparatus of a modification example of the embodiment.

Next, a modification example of the embodiment is described. FIG. 2 is a partially sectional view showing a tire vulcanizing apparatus of the present modification example.

In the present modification, instead of the gas supply portion 26, a steam supply portion 40 which supplies steam into the bladder 10 is provided.

The steam supply portion 40 supplies steam into the bladder 10 when vulcanization-molding with respect to the green tire 30X is performed, and recovers the steam from the inside of the bladder 10 after the vulcanization-molding. In the present embodiment, the steam supply portion 40 includes a steam pipeline 41 which is provided in one or both of the pair of bladder clamp rings 15 and communicates with the inner portion of the bladder 10, a compressor 42 which supplies and extracts the steam through the steam pipeline 41, and a boiler 43.

In the present modification example, since steam from the boiler 43 is supplied into the bladder 10 through the steam pipeline 41, the inner portion of the bladder 10 is pressurized, and the bladder 10 is heated. Since heat of the steam inside the bladder 10 is partially absorbed by the bladder 10, the green tire 30X, or the like, the steam may be liquefied. However, in the present modification example, since the heater 23 heats the bladder 10, high-temperature water stored in the bladder becomes steam again. Moreover, in the present modification, since the heater 23 directly heats the steam such that the steam is not liquefied, an effect is exerted, in which a gaseous state of the steam is maintained.

In the present modification example, since the steam is not liquefied and flows in the bladder 10, it is possible to uniformly heat the green tire 30X via the bladder 10 to which the steam is supplied.

Second Embodiment

Figure 3:
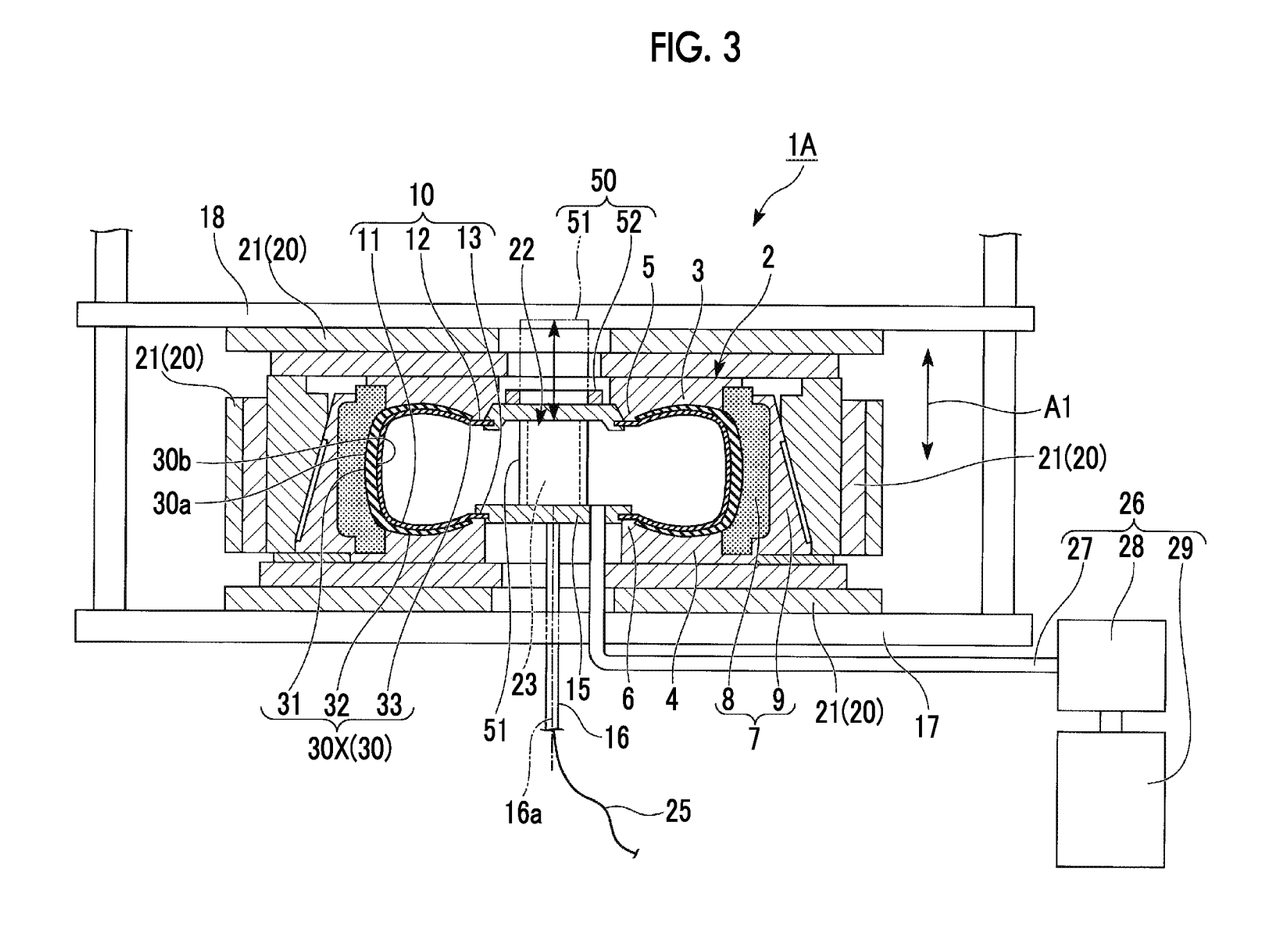
FIG. 3 is a partial sectional view showing a tire vulcanizing apparatus according to a second embodiment of the present invention.

A second embodiment of the present invention is described. FIG. 3 is a partial sectional view showing a tire vulcanizing apparatus of the present embodiment. In addition, in the present embodiment and a modification example thereof, the same reference numerals are assigned to the same components as those of the first embodiment, and overlapping descriptions thereof are omitted.

Compared to the tire vulcanizing apparatus 1 disclosed in the first embodiment, a tire vulcanizing apparatus 1A of the present embodiment shown in FIG. 3 is different from the tire vulcanizing apparatus 1 in that a shield portion 50 is further provided. That is, in the present embodiment, the inner heating mechanism 22 (heat portion) includes the shield portion 50 and the heater 23 described in the first embodiment.

The shield portion 50 includes a tubular shield member 51 which surrounds the heater 23, and a movement mechanism 52 which moves the shield member 51.

When the shield member 51 is positioned at a position at which the shield member 51 surrounds the heater 23, the shield member 51 is interposed between the heater 23 and the inner surface 30b of the green tire 30X. Accordingly, when the shield member 51 is positioned at the position at which the shield member 51 surrounds the heater 23, at least a portion of radiation heat emitted by the heater 23 is shielded, and the heat from the heater 23 is heat-insulated so as not to be transmitted to the bladder 10 and the green tire 30X. In addition, the shape of the shield member 51 is not particularly limited as long as it can surround the heater 23. For example, the shape of the shield member 51 is not limited to the tubular shape, and may be a rectangular cylindrical shape. In addition, the shield member 51 may block the radiation heat emitted from the heater 23 in all directions, and may block at least a portion of the radiation heat emitted from the heater 23. For example, the shield member 51 may be configured to block the radiation heat from the heater by a wall surface which is continuous in the circumferential direction which has the center line 16a of the center post 16 as a center, and may be configured to block a portion of the radiation heat from the heater 23 by a wall surface which is discontinuous in the circumferential direction which has the center line 16a of the center post 16 as a center.

The movement mechanism 52 includes an actuator (not shown), and thus, moves the shield member 51 with respect to the heater 23 between a shield position P1 at which the shield member 51 surrounds the heater 23 and an unshielded position P2 at which the heater 23 is positioned outside of the shield member 51.

In the present embodiment, since the shield member 51 is disposed at the unshielded position P2 in a process in which the dry gas or the steam is supplied into the bladder 10 and the green tire 30X is heated via the bladder 10, similarly to the first embodiment, the bladder 10 and the green tire 30X are heated by the heat of the heater 23.

After the green tire 30X is appropriately vulcanized, the supply of power with respect to the heater 23 stops. After the supply of power with respect to the heater 23 stops, the heater 23 continuously emits radiation heat with remaining heat of the heater 23. Here, in the present embodiment, the movement mechanism 52 moves the shield member 51 to the shield position P1, and the shield member 51 surrounds the heater 23. Accordingly, since the inner portion of the shield member 51 is filled with heat, heating generating excessive vulcanization with respect to the green tire 30X is prevented. In the state where the shield member 51 is positioned at the shield position P1, the excessive vulcanization does not easily occur due to the influence of the remaining heat of the heater 23, and in this state, it is possible to extract the vulcanized and molded tire 30 from the tire mold 2.

Modification Example

Figure 4:
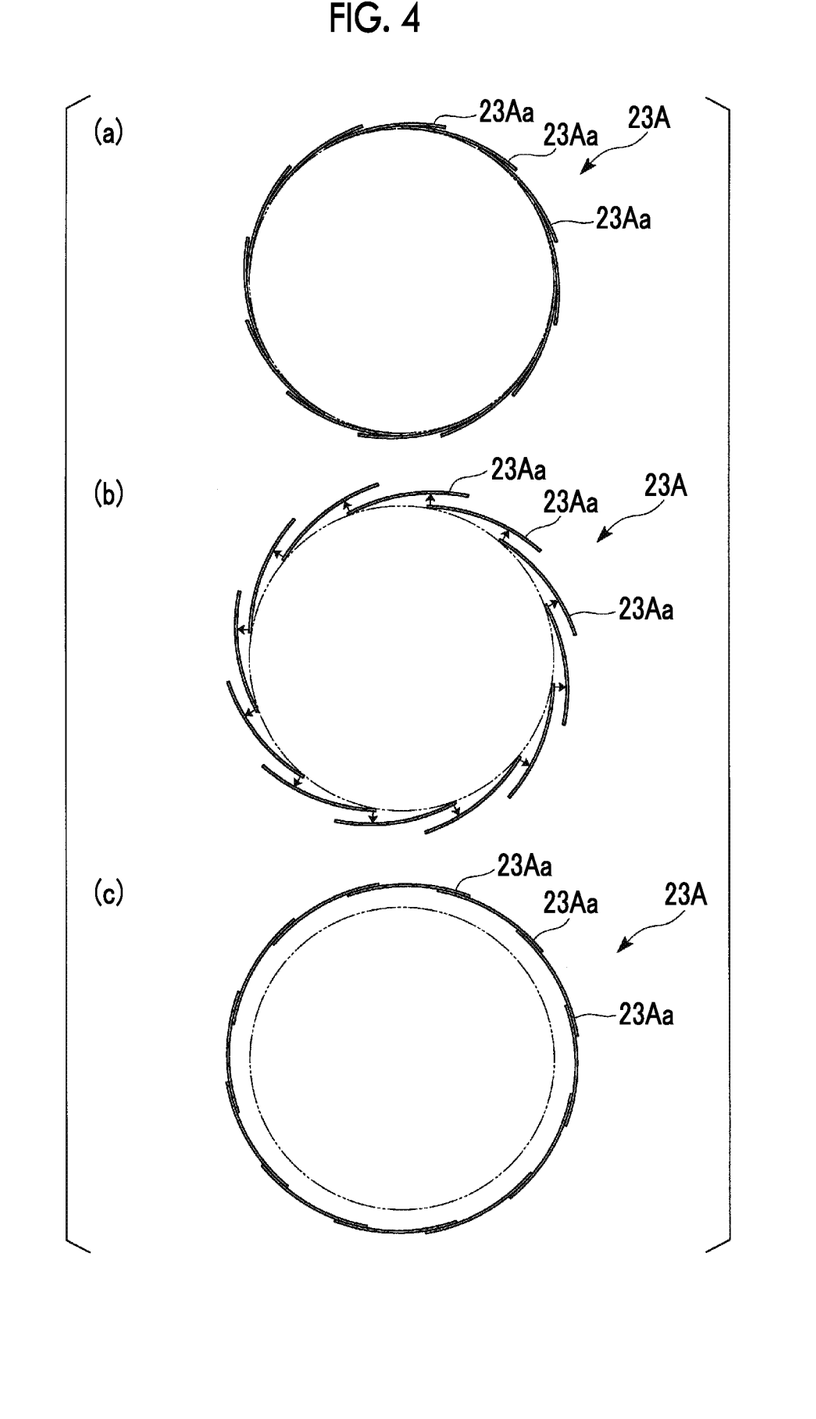
FIGS. 4(a) to 4(c) are partial plan views of a tire vulcanizing apparatus of a modification example of the embodiment.

A modification example of the embodiment is described. FIGS. 4(*a*), 4(*b*), and 4(*c*) are plan views showing a heater in a tire vulcanizing apparatus of the present modification example.

In the tire vulcanizing apparatus 1A (refer to FIG. 3) of the present modification example, a heater 23A different from the heater 23 described in the second embodiment is provided instead of the heater 23 described in the second embodiment.

The heater 23A shown in FIG. 4 can be configured of a tubular shape by combining a plurality of heater members 23Aa. The plurality of heater members 23Aa can be changed (refer to FIG. 4(*b*)) to any one of a state (storage state, FIG. 4(*a*)) where a portion of the heater members 23Aa overlap each other relatively more, and a state (heat generation state, FIG. 4(*c*)) where the heater members 23Aa adjacent to each other overlap each other less relative to the overlapping state shown in FIG. 4(*a*). In addition, the plurality of heater members 23Aa may be arranged to be butted to each other.

As shown in FIG. 4(*a*), in the state where a portion of the heater members 23Aa overlap each other, the heater 23A is formed in a tubular shape having a diameter capable of being accommodated inside the shield member 51.

As shown in FIG. 4(*c*), in the state where a portion of the heater members 23Aa overlap each other less, or in the state where the heater members 23Aa adjacent to each other are arranged so as to be butted to each other, the heater 23A is formed in a tubular shape having an outer diameter which is larger than the inner diameter of the shield member 51.

In the present modification example, the heater 23A can be accommodated inside the shield member 51. In addition, in the state where the heater 23A is not covered by the shield member 51 and the radiation heat is emitted, it is possible to emit the radiation heat, which is more than that which is generated by the heater 23A in the storage state, from the outer circumferential surface having a wider area than the area when the heater 23A is accommodated in the shield member 51 toward the bladder 10.

INDUSTRIAL APPLICABILITY

The present invention can be used in an apparatus which vulcanizes and molds a tire.

REFERENCE SIGNS LIST 1, 1A: tire vulcanizing apparatus
2: tire mold
3: upper side mold
4: lower side mold
5: upper bead ring
6: lower bead ring
7: tread mold
8: tread segment
9: slide segment
10: bladder
11: main body portion
12: upper clamp portion
13: lower clamp portion
14: center mechanism
15: bladder clamp ring
16: center post
17: mold fixing mechanism
18: mold lifting and lowering mechanism
20: tire heating mechanism
21: outer heating mechanism
22: inner heating mechanism
23: heater
24: radiation surface
25: wire
26: gas supply portion
27: gas pipeline
28: compressor
29: dry gas tank
30: tire
30X: green tire
31: tread portion
32: side wall
33: bead
40: steam supply portion
41: steam pipeline
42: compressor
43: boiler
50, 50A: shield portion
51: shield member
52: movement mechanism

The invention claimed is:

1. A tire vulcanizing apparatus, comprising:
a liftable center post which supports a green tire; and
a heating portion which is fixed to the center post, is disposed inside the green tire, and transmits heat from the inside of the green tire to the green tire by radiation heat,
wherein the heating portion includes:
a heater which emits the radiation heat; and
a movable shield portion which is interposed between the heater and an inner surface of the green tire and blocks the radiation heat from the heater.

2. The tire vulcanizing apparatus according to claim 1, wherein the shield portion includes:
a shield member which is formed in a tubular shape to surround the heater; and
a movement mechanism which moves the shield member between a shield position at which the shield member surrounds the heater and an unshielded position at which the heater is positioned outside of the shield member.

3. The tire vulcanizing apparatus according to claim 2, wherein the heater includes a plurality of heater members which is movable relative to each other, and wherein the plurality of heater members is disposed to be movable to any one of a storage state in which the plurality of heater members overlaps each other to have outer diameters capable of being accommodated in the shield member, and a heat generation state in which the plurality of heater members has outer diameters exceeding an inner diameter of the shield member and overlaps each other less relative to the storage state.

4. The tire vulcanizing apparatus according to claim 1, further comprising:
a bladder for pressing the inner surface of a green tire,
wherein the center post holds the heating portion inside the bladder.

5. The tire vulcanizing apparatus according to claim 4, further comprising:
a gas supply portion which supplies dry gas into the bladder.

6. The tire vulcanizing apparatus according to claim 4, further comprising:
a steam supply portion which supplies steam into the bladder.

* * * * *